United States Patent
Eslambolchi et al.

(10) Patent No.: US 6,273,621 B1
(45) Date of Patent: Aug. 14, 2001

(54) IN-LINE FIBER OPTIC CABLE SPLICE AND METHOD OF USING THE SAME

(75) Inventors: Hossein Eslambolchi, Basking Ridge, NJ (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/455,675

(22) Filed: Dec. 7, 1999

(51) Int. Cl.⁷ .................................................. G02B 6/255
(52) U.S. Cl. ............................ 385/95; 385/97; 385/98; 385/99; 385/135; 385/136; 385/58
(58) Field of Search .................................. 385/58, 95, 97, 385/98, 99, 135, 136

(56) References Cited

U.S. PATENT DOCUMENTS 4,822,131 * 4/1989 Anderton .............................. 385/58
5,189,725   2/1993 Bensel, III et al. .

\* cited by examiner

*Primary Examiner*—Cassandra Spyrou
*Assistant Examiner*—Craig Curtis

(57) ABSTRACT

A method and apparatus for providing an in-line fiber optic cable splice is sufficiently compact so as to allow for the spliced assembly to be wound onto a conventional fiber reel. Various short lengths (for example, 1000 to 3000 feet) of fiber cable can thus be spliced together to form a more conventional length of cable that can be used in different situations. The in-line splice comprises a pair of grip blocks for supporting the end portions of a pair of fiber cables to be spliced together. A pair of metallic sleeves are disposed over the fiber ends, with the cable strength members bent backward over the sleeves, exposing the bundle of optical fibers in the center of the cable. After splicing the cables together, a buffer tube is positioned over the fused region to protect the fibers. An outer heat shrink protective layer is disposed to cover the pair of grip blocks, as well as the buffer tube encased splice region.

11 Claims, 1 Drawing Sheet

IN-LINE FIBER OPTIC CABLE SPLICE AND METHOD OF USING THE SAME

TECHNICAL FIELD

The present invention relates to an in-line fiber optic cable splice and method and, more particularly, to a splice arrangement that is relatively compact and may be used to join together short lengths of cable and allow them to be stored on a conventional cable reel.

BACKGROUND OF THE INVENTION

Fiber optic cable is usually supplied by vendors in standardized lengths of three kilometers or five kilometers, the cable itself being wound on a reel. In practice, fiber optic cables are ordered from a manufacturer in one of these standard lengths and installed in the ground with splice points at the ends of the cables. In some circumstances, it becomes necessary to cut the fiber cable at different lengths due to, for example, hazards along the installation path, short haul communication paths, or various other physical path impediments. Once the cable is cut, the fiber cable left on the reel may range in length from 1000 to 3000 feet. The majority of the time, this "left over" fiber optic cable is stored at various locations for future use—but due to its short length is infrequently used and is usually forgotten. With the known improvements in optical fiber splicing, particularly fusion splicing, there is extremely low optical signal loss in the splice region and it is possible to splice together various pieces of this "left over" fiber optic cable. However, the splice enclosures well known and used in the art, such as that disclosed in U.S. Pat. No. 5,189,725, issued to W. H. Bensel, III et al. on Feb. 23, 1993, significantly increase the bulk of the cable and, as a result, prevent the spliced cable from being wound on a conventional fiber optic cable reel.

A need remains, therefore, for an arrangement suitable for splicing together short lengths of fiber optic cable where the arrangement allows for the spliced cable to be stored on a conventional cable reel.

SUMMARY OF THE INVENTION

The need remaining in the art is addressed by the present invention, which relates to an in-line fiber optic cable splice and method and, more particularly, to a splice arrangement that is relatively compact and may be used to join together short lengths of cable and allow them to be stored on a conventional cable reel.

In accordance with the present invention, an in-line cable splice comprises a pair of relatively small grip blocks, each grip block used for supporting a separate one of short length cables being spliced together. A metal sleeve is associated with each grip block and is disposed to cover an end section of the associated fiber cable to receive the metallic strength members of the cable when pulled backward to cover the metallic sleeve. A section of buffer tube is inserted over one end of the exposed bundle of optical fibers. Once the proper fibers from each cable are spliced together (using fusion splicing, for example), the buffer tube is re-positioned to cover the splice region. After the buffer tube is in place, a layer of heat shrink material is disposed to cover the entire assembly and heated to a temperature sufficient to provide a protective seal. The overall dimensions for the in-line splice of the present invention may be, for example, one to two inches in diameter and 6"–12" in length. In comparison, a conventional prior art splice enclosure may have the dimensions of a rectangular prism on the order of 6"×24".

In a preferred embodiment, each grip block comprises a pair of housings, locked together with metal screws. At least one flexible metal wire may be used to join the bottom halves of the pair of grip blocks, where the flexible metal wire (which is also covered with the heat shrink material) functions as an additional strength member for the in-line splice.

Other and further arrangements of the present invention will become apparent during the course of the following discussion and by reference to the accompanying drawings.

BRIEF DESCRIPTION OF THE DRAWINGS

Referring now to the drawings, where like reference numerals represent like parts in several views.

DETAILED DESCRIPTION

Figure 1:
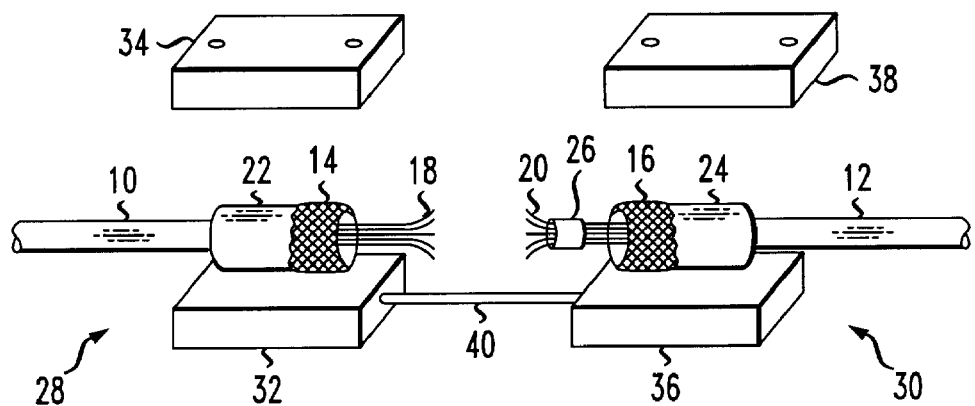
FIG. 1 illustrates, in an exploded form, a preliminary step in the process of forming an in-line fiber optic cable splice in accordance with the present invention.

Referring to FIG. 1, a preliminary arrangement of the present invention is illustrated for joining a first fiber optic cable 10 to a second fiber optic cable 12. In preparation for splicing, outer protective layers of the cable (not shown) may be removed from the splice region, leaving only metallic strength members 14, 16 and optical fiber bundles 18, 20. As shown in FIG. 1, cable 10 is defined as comprising metallic strength members 14 and optical fibers 18, whereas cable 12 is defined as comprising metallic strength members 16 and optical fibers 20.

A first metallic sleeve 22 is disposed over the end of first fiber optic cable 10, with metallic strength members 14 being folded back to cover sleeve 22. Similarly, a second metallic sleeve 24 is disposed over the end of second fiber optic cable 12, with strength members 16 folded back over second sleeve 24. A buffer tube 26 is disposed over an exposed bundle of optical fibers; in the arrangement illustrated in FIG. 1, buffer tube 26 is disposed over bundle 20. In a preferred embodiment, buffer tube 26 comprises a material such as a low density polyethylene (LDPE), although other suitable materials that exhibit "heat shrinking" properties may be used.

As shown in FIG. 1, first metallic sleeve 22 and the associated fiber cable assembly are disposed in a first grip block 28. Second metallic sleeve 24 and its associated assembly are similarly disposed in a second grip block 30. In the embodiment as illustrated in FIG. 1, first grip block 28 comprises a bottom half 32 and top half 34, where the halves are joined by a set of screws to fix the components in place. Second grip block 30 similarly comprises a bottom half 36 and top half 38. In a preferred embodiment of the present invention, at least one flexible steel wire 40 is disposed between bottom halves 32 and 36, where flexible steel wire 40 will impart additional strength to the final in-line splice arrangement. In a preferred embodiment, a plurality of such flexible steel wire strength members are used.

Figure 2:
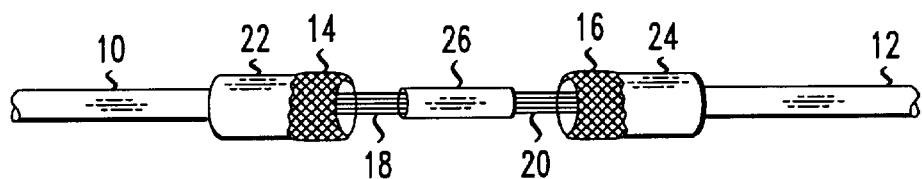
FIG. 2 shows, in a simplified view, the inclusion of a buffer tube over a fused section of fiber optic cable, disposed between a pair of metal sleeves, in accordance with the present invention.

Once all of these piece parts are in place, the individual optical fibers within bundles 18 and 20 may be spliced together. Preferably, a process such as fusion splicing is used to ensure optimal signal quality in the spliced fibers. However, any other suitable technique may be used and, in general, the method used to join the fibers is not germane to the subject matter of the present invention. After the splicing operation has been completed, buffer tube 26 is re-positioned to cover the splice area. FIG. 2 illustrates a portion of the arrangement of the present invention, upon completion of the splicing process, illustrating the location of buffer tube 26 with respect to fiber bundles 18 and 20.

Figure 3:
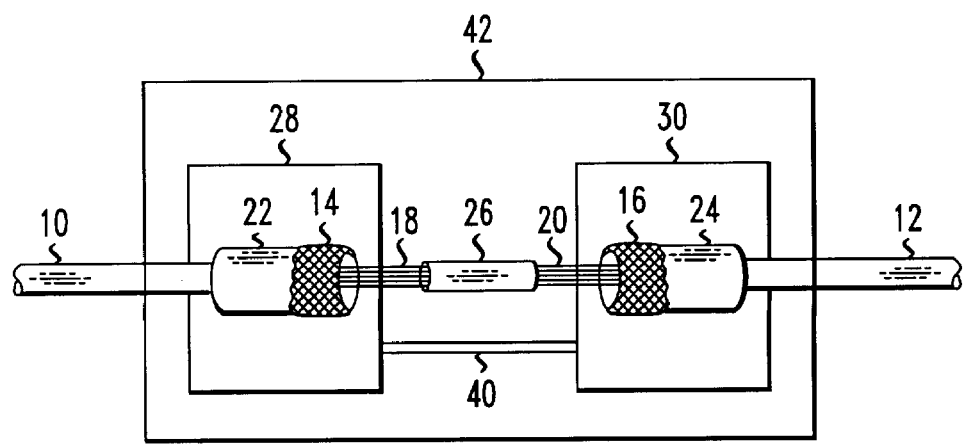
FIG. 3 is a cut-away view, in simplified form, of the arrangement of the present invention, illustrating the buffer tube, grip blocks and surrounding heat shrink material used for encasing the in-line splice.

The final component in the arrangement of the present invention is a section of heat shrink material that is used to cover the final assembly and allow the in-line splice to be wound upon a conventional cable reel. Referring to FIG. 3, a section of heat shrink material 42, such as LDPE, is illustrated as covering the remaining components of the in-line splice. In particular, heat shrink material 42 is disposed to cover grip blocks 28, 30 and the splice region therebetween, as covered by buffer tube 26. With material 42 in place, the assembly is heated to a temperature sufficient to allow for the heat shrink material to adhere to the components and form a protective coating. Upon the completion of this step, the pair of joined fiber cables 10, 12, including the in-line splice, may be transported to, and wound upon, a conventional fiber optic cable reel.

In a preferred embodiment of the present invention, each grip block comprises dimensions on the order of ½"×½", and uses a section of buffer tube of length 5–6", such that the overall dimensions of the in-line splice are approximately 6–12". It is to be understood that these dimensions are exemplary only, for the purposes of illustrating the compact nature of the in-line splice arrangement of the present invention. In general, the components and processes described above may be used to provide an in-line splice of essentially any desired size. Moreover, the various defined materials used for each piece part are considered to be exemplary only and, in particular, any suitable material may be used to form the grip blocks, buffer tube and heat shrink protective coating. Summarizing, the spirit and scope of the present invention is considered to be limited only by the claims appended hereto.

What is claimed is:

1. An in-line splice arrangement for joining a first fiber optic cable to a second fiber optic cable, each cable defined as comprising an inner bundle of optical fibers and at least one outer metallic strength member, the in-line splice arrangement comprising a pair of metal sleeves, each metal sleeve disposed to cover an end portion of an associated fiber optic cable with each metallic strength members of said associated fiber optic cable bent backwards over said metal sleeve;

a pair of grip blocks, each grip block for supporting and encasing a separate one of the first and second fiber optic cables and associated metal sleeve;

a buffer tube disposed to surround a spliced region where the inner bundle of optical fibers from the first fiber optic cable are joined to the inner bundle of optical fibers from the second fiber optic cable; and a heat shrink protective coating disposed to cover the pair of grip blocks and the buffer tube disposed therebetween.

2. An in-line splice arrangement as defined in claim 1 wherein the arrangement further comprises at least one flexible strength member disposed between the pair of grip blocks and encased within said heat shrink protective coating.

3. An in-line splice arrangement as defined in claim 2 wherein the at least one flexible strength member comprises a steel wire.

4. An in-line splice arrangement as defined in claim 2 comprising a plurality of strength members.

5. An in-line splice arrangement as defined in claim 1 wherein each grip block comprises a bottom support member and a top cover member.

6. An in-line splice arrangement as defined in claim 5 wherein at least one threaded screw is used to attach a top cover member to an associated bottom support member.

7. An in-line splice arrangement as defined in claim 1 wherein the pair of metal sleeves comprise steel.

8. An in-line splice arrangement as defined in claim 1 wherein the buffer tube comprises low density polyethylene.

9. A method for performing an in-line splice between a first fiber optic cable and a second fiber optic cable, each cable comprising an inner bundle of optical fibers and a plurality of outer metallic strength members, the method comprising the steps of:

a) disposing a metallic sleeve over an end of each fiber optic cable;

b) bending each fiber optic cable metallic strength member backwards over the associated metallic sleeve;

c) inserting a buffer tube over an exposed bundle of optical fibers;

d) placing the first fiber optic cable, including the metallic sleeve, in a first grip block and the second fiber optic cable, including the metallic sleeve, in a second grip block;

e) splicing the optical fibers from the first fiber optic cable to the associated fibers in the second fiber optic cable;

f) re-positioning the buffer tube to cover the fused region;

g) covering the assembly of step f), including the grip blocks of step d) with a heat shrink protective coating.

10. The method as defined in claim 9 wherein in performing step e), fusion splicing is used.

11. The method as defined in claim 9 wherein prior to performing the covering of step g), at least one flexible strength member is attached between the pair of grip blocks.

* * * * *